W. G. HAWLEY.
TRACTOR DRAWN AUTOMOBILE.
APPLICATION FILED APR. 5, 1915.

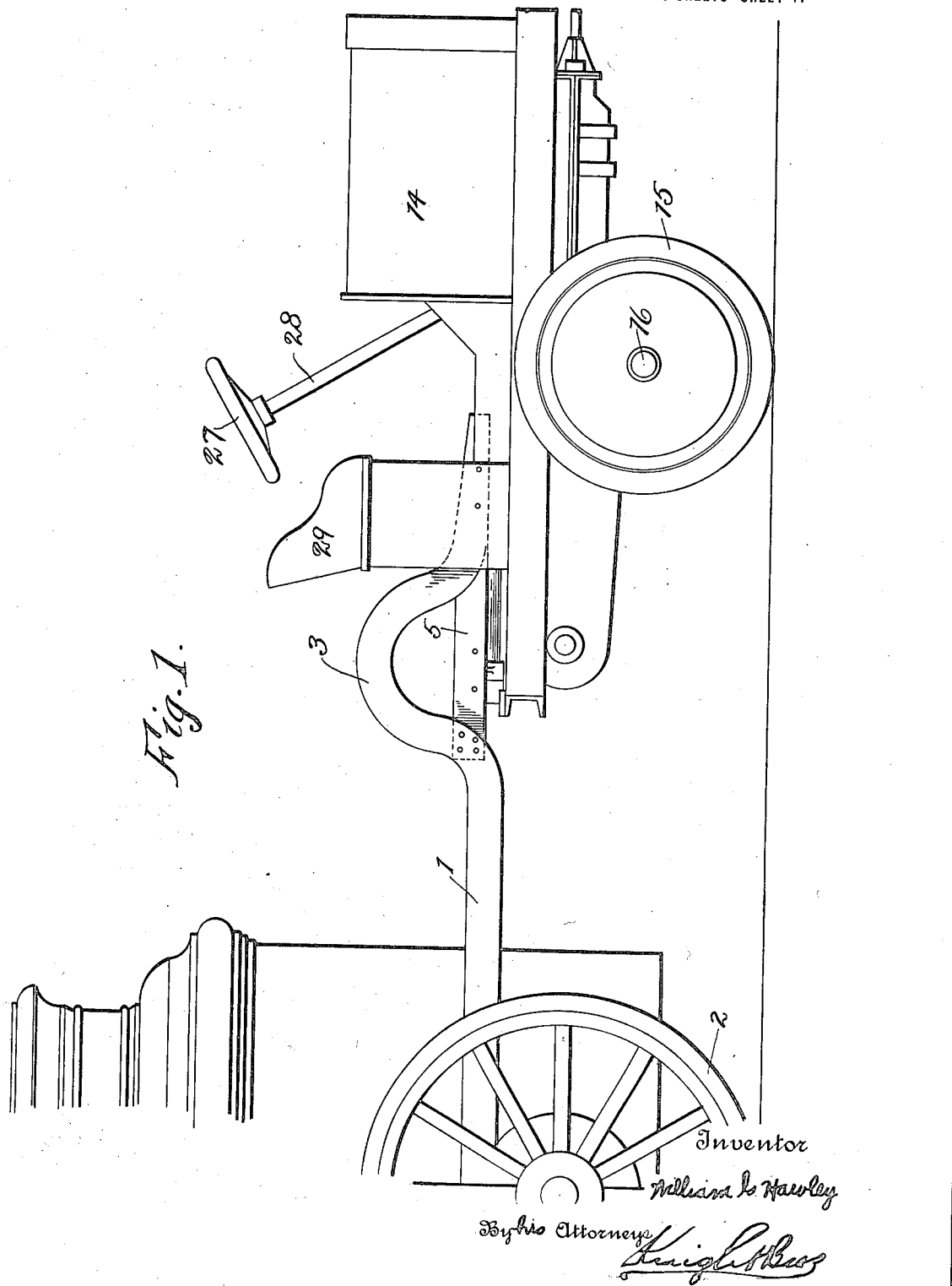

1,195,216.

Patented Aug. 22, 1916.
3 SHEETS—SHEET 2.

Inventor
William G. Hawley
By his Attorneys

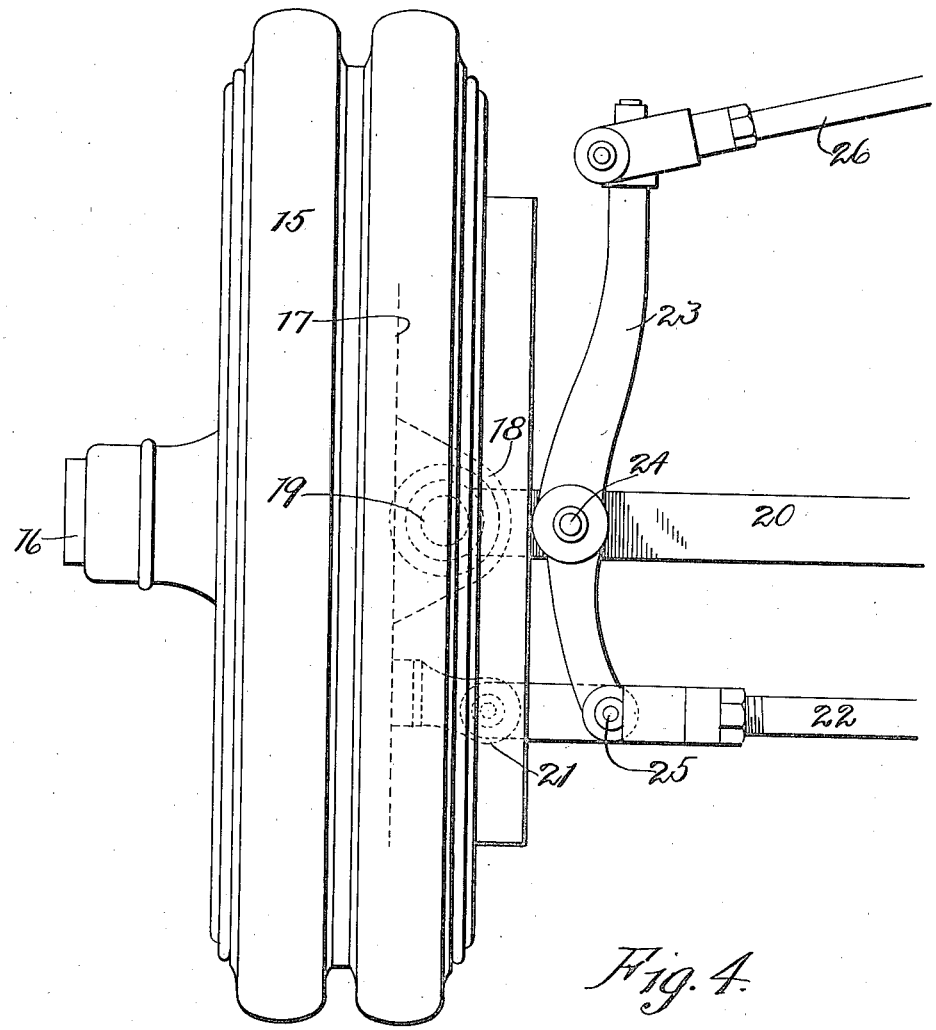

UNITED STATES PATENT OFFICE.

WILLIAM GUY HAWLEY, OF ELMIRA, NEW YORK, ASSIGNOR TO AMERICAN LA FRANCE FIRE ENGINE COMPANY, INC., OF ELMIRA, NEW YORK, A CORPORATION OF NEW YORK.

TRACTOR-DRAWN AUTOMOBILE.

1,195,216.  Specification of Letters Patent.  Patented Aug. 22, 1916.

Application filed April 5, 1915. Serial No. 19,269.

*To all whom it may concern:*

Be it known that I, WILLIAM G. HAWLEY, a citizen of the United States, and a resident of Elmira, in the county of Chemung and State of New York, have invented certain new and useful Improvements in Tractor-Drawn Automobiles, of which the following is a full and clear specification.

This invention relates to tractor drawn automobiles and has for its primary object to provide an improved construction, combination and arrangement of parts which will render a two wheel tractor better adapted to be employed in heavy service such for example as fire apparatus automobiles.

One of the objects of the present invention is to provide improved coupling means whereby a tractor and trailer may be suitably connected in a manner to hold them substantially rigid as far as relative swinging movements are concerned while permitting relative angular adjustment about a longitudinal horizontal axis so that whenever the wheel base of the trailer wheels is inclined at a different angle to the horizontal than the wheel base of the tractor wheels, there will be no consequent torsion in either of said frames.

Other and further objects will appear in the specification and be pointed out in the append. d claim, reference being had to the accompanying drawings in which—

Figure 3:
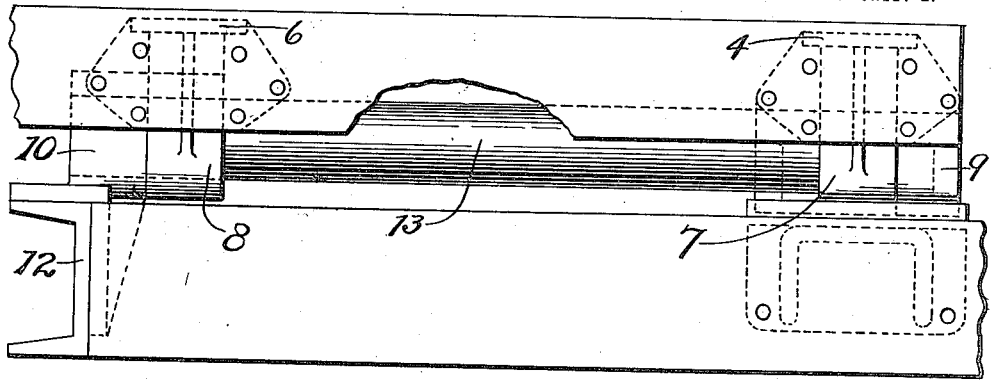
Figure 2:
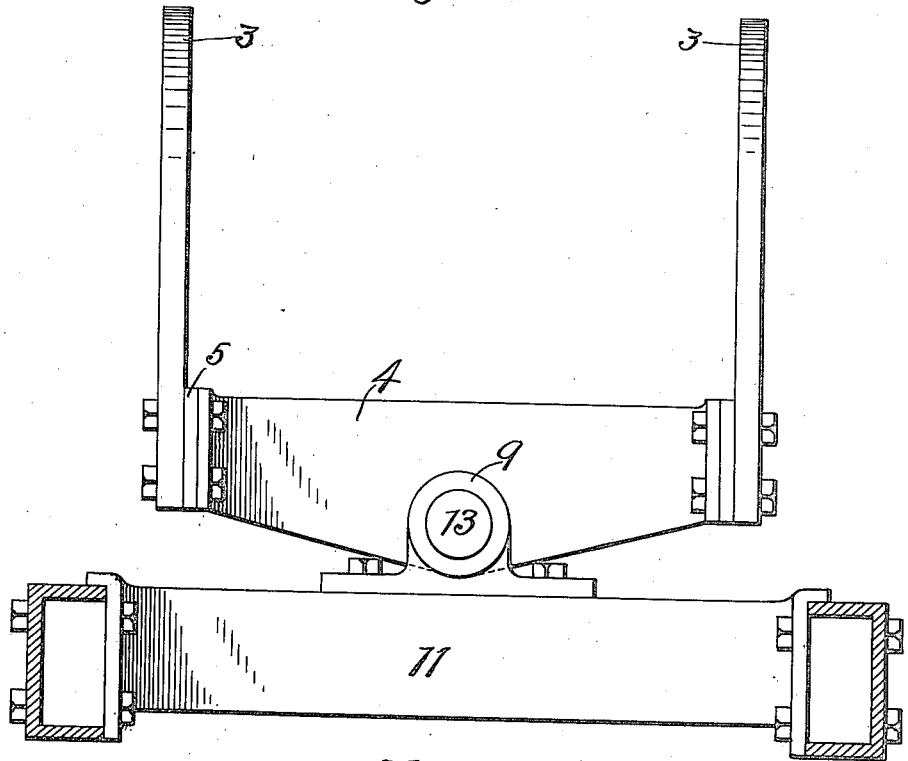

Figure 1 is a side elevation of an automobile fire engine provided with my improvements; Fig. 2 is a front elevation of the coupling connections between the main body-frame and tractor-frame, parts being omitted and parts shown in section; Fig. 3 is a fragmentary side elevation of the same, parts being broken away and parts omitted; Fig. 4 is a fragmentary top plan view of one of the wheel mounts on the tractor.

It is old and well known in the art to couple the front wheels of a vehicle to the main body frame thereof on a longitudinal axis which permits a relative lateral oscillation between the front wheels and the body frame but the steering movements of the vehicle are usually accomplished by swinging the front wheels as a unit about a common swinging axis, which is the king bolt, the fifth wheel device being necessarily a part of the coupling. It is also old in the art to apply this construction to an automobile tractor in which the power driven wheels are journaled on opposite ends of a dead axle which swings about the king bolt as an axis with the support of a fifth wheel. It is furthermore old in the art to couple up a tractor to the front wheels of a four wheeled vehicle which carry the fifth wheel for properly supporting the forward end of the main body frame during the steering movements of the front wheels about the king pin as an axis. In certain kinds of traffic such, for example as fire apparatus automobiles employing tractors, it is very desirable to eliminate all tendency toward relative swinging movements between two such heavy masses as the tractor frame which carries the power plant and other apparatus, and the fire-fighting apparatus. Thus at the high speeds at which fire apparatus automobiles are commonly operated, it becomes highly important that these heavy masses should be securely connected in such a way as to render them a single unitary body in so far as their forward movement is concerned. At the same time it is desirable to have a limited angular adjustment to prevent the development of torsional strains.

The present invention contemplates the maintenance of the same wheel base on turns as on straight-away courses in automobiles which embody a trailer and a two-wheeled tractor, while at the same time rigidly holding the tractor and trailer frames against relative lateral swing without producing torsional strains due to the wheel base of the trailer having a different inclination than the wheel base of the tractor.

On Fig. 1 of the drawings is shown a fire engine provided with an automobile tractor. The main body frame of the fire engine comprises spaced side bars 1 which are presented forwardly from the rear wheels 2 and provided with goose necks 3. As shown in Fig. 2 of the drawings, the goose necks 3 are rigidly united at their forward ends by a transverse beam or support 4. Extending longitudinally of each of the side bars 1 and across the goose neck 3 is a tie bar 5 (see Fig. 1) the forward ends of said tie bars being interposed between the forward ends of goose necks 3 and the lateral ends of the transverse beam 4 (see Fig. 2). The rear ends of the tie bars 5 are interposed between the side bars 1 and a similar transverse beam 6 shown in dotted lines in Fig. 3. The beams 4 and 6 are provided with bearings 7 and 8 which are coaxially disposed and abut against similar bearings 9 and 10 which are mounted on transverse bars 11 and 12 of a tractor frame. A longitudinally arranged shaft 13 extends through these alined bearings and permits lateral oscillation between the main body frame and the tractor frame but prevents any longitudinal relative oscillation therebetween. As shown in Fig. 1, an engine 14 is mounted on the forward end of the tractor frame and together with suitable transmission gearing which is not specifically shown on the drawings, constitutes a power plant for driving the steering wheels 15. As shown in Fig. 4 of the drawings, each of the steering wheels 15 is mounted on a stub axle 16 which is carried by a plate or disk 17, said plate or disk being in turn provided with vertically spaced bearing lugs 18 within which are journaled the opposite ends of a vertical shaft 19 carried in the outer end of a dead axle 20. The plate or disk 17 is furthermore provided with a lug 21 which is connected by a rod 22 to a similar lug on the opposite steering wheel (not shown on the drawings). The oscillatory lever 23 which is pivoted at 24 on the dead axle 20 is connected at 25 with the rod 22 and when oscillated by a rod 26 connected to the other end of said lever 23, serves to impart the steering movements to the wheels 15 about the shafts 19.

It will be noted from Fig. 1 that the engine 14 is mounted forwardly of the stub axle 16, whereas the coupling between the main body frame and the tractor frame comprising the parts hereinbefore described is mounted on the rear end of said frame. A steering wheel 27 carried by a steering rod 28 is adapted to impart steering movements to steering wheels 15 by means of the steering lever 23, rod 26 and other connections not shown on the drawings. The chauffeur's seat 29 is mounted directly upon the tractor frame as shown in Fig. 1. The advantages of this construction in heavy high speed automobile service will now be readily understood and briefly stated are:

The inherent advantages of a tractor are thus retained without subjecting the power plant to the twisting strains due to any irregularities in the road over which the automobile may be driven, by permitting the wheel base of the forward wheels to be displaced relatively to the wheel base of the rear wheels. At the same time, the entire wheel base is maintained substantially constant in form and extent during the turning movements of the automobile and the disadvantages of the 5th wheel king pin construction are entirely obviated.

What I claim is:

In an automobile, the combination with a main body frame provided with a forwardly extending portion, of a two-wheel tractor provided with a frame extending in opposite directions from the wheel axis, an engine mounted on said tractor frame, on one side of said wheel axis, and means on the other side of said wheel axis for coupling said tractor frame to said forwardly extending portion of the main body frame, said coupling means being adapted to permit relative lateral oscillations between said tractor frame and main body frame and to prevent relative oscillation therebetween in a direction longitudinal of the main body frame.

WILLIAM GUY HAWLEY.

Witnesses:
 CHARLES S. BAKER,
 JOHN HULBUT.